US012774048B2

(12) United States Patent
Furia et al.

(10) Patent No.: US 12,774,048 B2
(45) Date of Patent: Oct. 27, 2026

(54) REMOTE ELECTRONIC SHOCK ADJUSTER

(71) Applicant: Fox Factory, Inc., Duluth, GA (US)

(72) Inventors: Weston Furia, Felton, CA (US); Connor Randall, Salida, CO (US); Rick Strobel, Brainerd, MN (US)

(73) Assignee: Fox Factory, Inc., Duluth, GA (US)

( * ) Notice: Subject to any disclaimer, the term of this patent is extended or adjusted under 35 U.S.C. 154(b) by 369 days.

(21) Appl. No.: 18/388,491

(22) Filed: Nov. 9, 2023

(65) Prior Publication Data

US 2025/0153789 A1 May 15, 2025

(51) Int. Cl.
*B62D 55/104* (2006.01)
*B60G 17/015* (2006.01)
*B60G 17/005* (2006.01)

(52) U.S. Cl.
CPC ......... *B62D 55/104* (2013.01); *B60G 17/015* (2013.01); *B60G 17/005* (2013.01); *B60G 2204/62* (2013.01); *B60G 2300/322* (2013.01); *B60G 2500/11* (2013.01)

(58) Field of Classification Search
CPC ............................ B62D 55/104; B60G 17/015
See application file for complete search history.

(56) References Cited

U.S. PATENT DOCUMENTS 8,695,745 B2 * 4/2014 Gagnon ................ B62M 27/02 180/184
8,838,335 B2 9/2014 Bass et al.
9,353,818 B2 5/2016 Marking
9,682,604 B2 6/2017 Cox et al.
9,797,467 B2 10/2017 Wootten et al.
10,036,443 B2 7/2018 Galasso et al.
10,415,662 B2 9/2019 Marking
11,479,075 B2 * 10/2022 Graus .................. B60G 17/016
11,713,093 B2 * 8/2023 Ericksen ................ B60G 3/145 280/124.157
11,975,792 B2 * 5/2024 Ericksen ................ B60G 17/06
12,112,579 B2 * 10/2024 Allinger ................. G06Q 10/20
12,330,734 B2 * 6/2025 Ericksen ................... F16F 9/50
12,379,011 B2 * 8/2025 Randall .................... F16K 31/02
12,429,106 B2 * 9/2025 Ericksen .............. B62K 25/286
2014/0353933 A1 * 12/2014 Hawksworth ...... B60G 17/0272 280/5.5
2016/0059660 A1 * 3/2016 Brady ................ B60G 17/0165 701/37
2017/0087950 A1 * 3/2017 Brady .................. B60G 17/016
2021/0362806 A1 * 11/2021 Hedlund ................ B62M 27/02
2022/0025954 A1 * 1/2022 Pickett .................... B62K 25/06
2022/0412426 A1 * 12/2022 Randall .................... F16F 9/462
2025/0282194 A1 * 9/2025 Graus ................ B60G 17/0164
2025/0354594 A1 * 11/2025 Randall .................... F16K 31/02
2026/0008312 A1 * 1/2026 Ericksen ................ B60G 17/06

* cited by examiner

*Primary Examiner* — Kevin Hurley

(57) ABSTRACT

An remote electronic shock adjuster is disclosed. The shock assembly with the electronic shock adjuster includes an electronic valve, the electronic valve configured to adjust a compression stiffness of the shock assembly. A switch is communicatively coupled with the electronic valve and configured to provide a signal to the electronic valve to lockout the shock assembly or return the shock assembly to a pre-lockout configuration.

9 Claims, 10 Drawing Sheets

50

500

REMOTE ELECTRONIC SHOCK ADJUSTER

FIELD OF THE INVENTION

Embodiments of the invention generally relate to an electronically adjustable shock assembly.

BACKGROUND

Shock assemblies are used in numerous different vehicles and configurations to absorb some or all of a movement that is received at a first portion of a vehicle before it is transmitted to a second portion of the vehicle. For example, when a front ski of a snowmobile hits a rough spot, the encounter will cause an impact force on the ski. However, by utilizing suspension components including one or more dampers, the impact force can be significantly reduced or even absorbed completely before it is transmitted to a user holding the handlebars of the vehicle.

Conventional shock assemblies provide a constant damping rate during compression or extension through the entire length of the stroke. As various types of recreational and sporting vehicles continue to become more technologically advanced, what is needed in the art are improved techniques for varying the performance characteristics of the shock assemblies.

BRIEF DESCRIPTION OF THE DRAWINGS

Aspects of the present invention are illustrated by way of example, and not by way of limitation, in the accompanying drawings, wherein.

Figure 1:
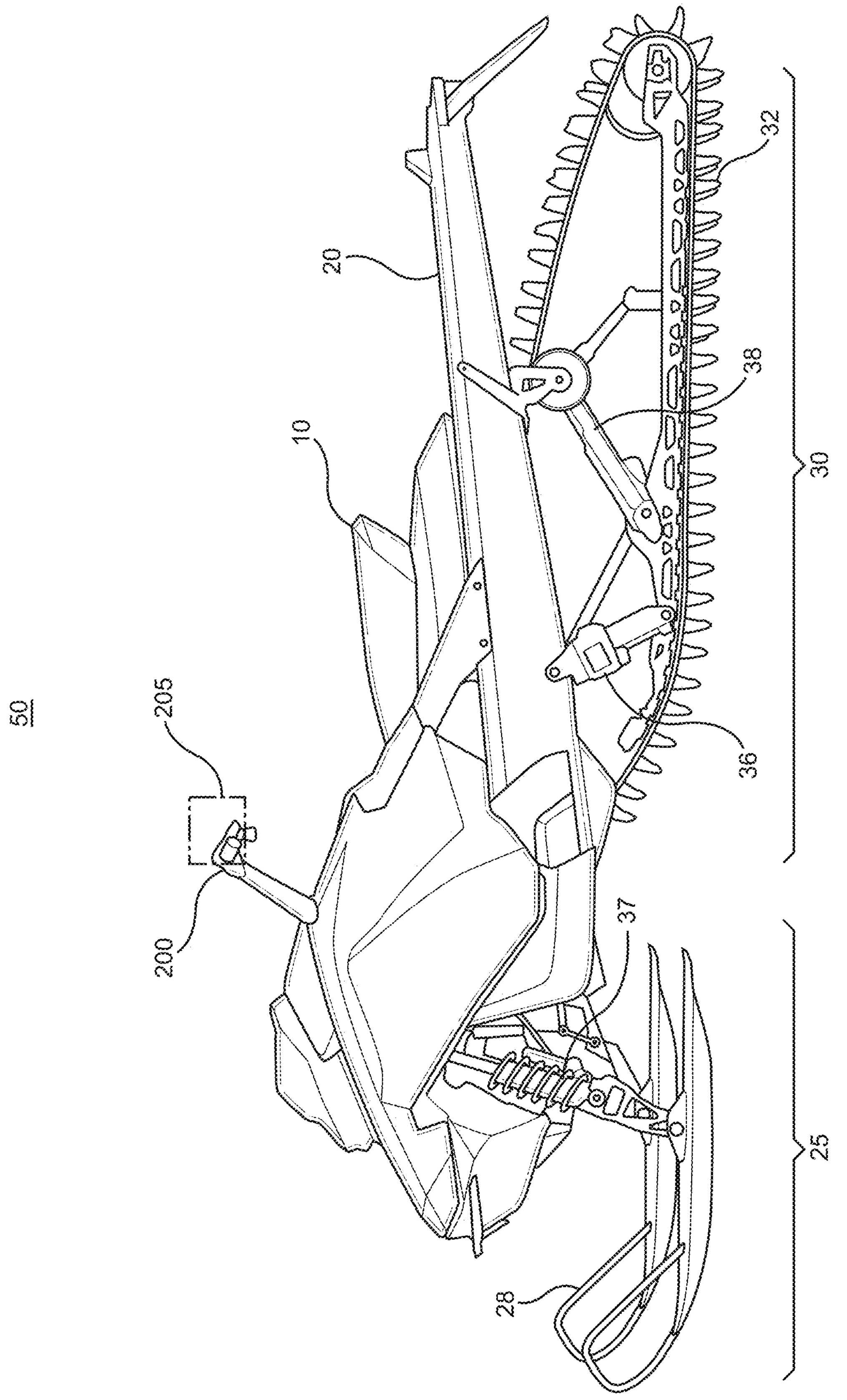
FIG. 1 is a perspective view of a snowmobile including a rear track shock assembly with an electronic valve, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of different suspension systems that use a shock assembly, a snowmobile (e.g., snowmachine, etc.) is used in the following description for purposes of clarity.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

In one embodiment, there may be times where specific changes to one, or some, but not all of the suspension component are desired during a given ride/drive. For example, a user of a snowmobile (or other rear-suspended vehicle) that is performing a hill climb, traversing a section of deep snow, loose fresh snow, or the like, would benefit by being able to proficiently firm up and/or lockout a shock assembly coupled with the rear track without necessarily modifying the damping characteristics of any other shock assemblies of the machine. Similarly, a bike rider in a sprinting scenario would often want to firm up or possibly even lockout the suspension component to remove the opportunity for rider induced pedal bob.

The term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, electric motor, poppet, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

In the following discussion, an electronically adjustable component (or electronic valve) may be active and/or semi-active. In general, the electronic valve will have one or more electronically adjustable features controlled by a motive component such as a power resistor, solenoid, stepper motor, electric motor, or the like. In operation, the electronic valve will receive an input command which will cause the motive component to move, modify, or otherwise change one or more aspects of one or more electronically adjustable features.

In one embodiment, the electronic valve includes a manual command lockout capability. In one embodiment, a manual command lockout capability is provided by a rotary spool type base valve. In one embodiment, the manual command lockout capability is provided by a check shim type base valve architecture. In one embodiment, the manual command lockout capability is provided by a stand-alone valve. In one embodiment, the manual command lockout capability is added to a quick switch base valve architecture.

With respect to the term lockout, for purposes of the following discussion, lockout refers to the most restricted flow state attainable or desirable. Thus, in one embodiment, lockout refers to a stoppage of all fluid flow through a given flow path. However, in another embodiment, lockout does not stop all the fluid flow through a given flow path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In another embodiment, lockout does not stop all the fluid flow through a given flow path but instead refers to the firmest compression setting available to a shock assembly. For example, if an electronic valve is locked out (or placed in its most restricted position), in one embodiment, the fluid flow would be reduced through some portion of the valving, but there would remain other flow paths such as blow-off paths, and the like. As such, in one embodiment, the lockout of an electronic valve would be similar to placing the valve in its firmest compression configuration.

Operation

Referring now to FIG. 1, a perspective view of a snowmobile 50 with a shock assembly having an electronic valve (e.g., rear track shock assembly 38 with electronic valve 500) is shown in accordance with an embodiment. Although a snowmobile 50 is used in the discussion, the electronic valve disclosed herein is also suited for use in one or more shock assemblies on other vehicles such as, but not limited to a bicycle, an electric bike (e-bike), a hybrid bike, a snowbike, a scooter, a motorcycle, an ATV, a personal water craft (PWC), a vehicle with three or more wheels (e.g., a UTV such as a side-by-side, a car, truck, etc.), an aircraft, and the like. In one embodiment, the electronic valve disclosed herein is also suited for use in one or more shock assemblies of a suspension inclusive device such as, but not limited to, an exoskeleton, a seat frame, a prosthetic, a suspended floor, and the like. However, in the following discussion, and for purposes of clarity, a snowmobile 50 is utilized as the example vehicle.

In general, snowmobile 50 includes a frame 5, seat 10, tail section 20, handlebars 200, front steering assembly 25, rear suspension assembly 30, and a track 32 driven by the engine of snowmobile 50 and supported by the rear suspension assembly 30.

In one embodiment, front steering assembly 25 includes front skis 28 and front shock assemblies 37. In one embodiment, rear suspension assembly 30 includes a front track connection with front track shock assembly 36, and a rear track connection with a rear track shock assembly 38.

In one embodiment, snowmobile 50 will only include a limited number of the electronically actuated components, interactive components, and/or control features. For example, a snowmobile 50 might only include user interface 205 and rear track shock assembly 38 where the only setting that is electronically adjustable is the lockout setting.

In one embodiment, there may be times where specific changes to one, or some, but not all of the suspension component are desired during a given ride/drive. For example, a user of a snowmobile 50 (or other rear-suspended vehicle) that is performing a hill climb, traversing a section of deep snow, loose fresh snow, or the like, would benefit by being able to proficiently firm up and/or lockout rear track shock assembly 38 without necessarily modifying the damping characteristics of any other shock assemblies (e.g., front shock assemblies 37 and front track shock assembly 36) of snowmobile 50.

For example, when the snowmobile 50 is normally operating, each of the shock assemblies (e.g., front shock assemblies 37, front track shock assembly 36, and rear track shock assembly 38) of the suspension are working to provide the best ride for a given scenario. They are absorbing bumps, reducing and/or removing the energy from impacts before that energy reaches the user, keeping the snowmobile components in contact with the surface, etc.

Thus, for many parts of a ride, the suspension settings are a compromise to obtain the desired performance. However, during a ride, when a user encounters a hill climb, deep and/or loose snow, or the like, the normal rear track shock assembly 38 settings can allow the rear suspension assembly 30 and track 32 to close toward the tail section 20 causing the snowmobile 50 to take on a nose high attitude.

Although during such events the rear suspension assembly 30 (and specifically rear track shock assembly 38 and track 32) to close toward the tail section 20, the other suspension assemblies (e.g., front shock assemblies 37 and front track shock assembly 36) are not similarly affected. In contrast, the remaining suspension assemblies (e.g., front shock assemblies 37 and front track shock assembly 36) are best suited to continue to provide the established damping and rebound characteristics to absorb events thereby keeping the snowmobile 50 from bouncing around too much, jarring the user, or otherwise causing a reduction and/or loss of control.

For example, in a hill climbing scenario, as the hill climb commences, normal rear track shock assembly 38 settings can allow the rear suspension assembly 30 and track 32 to close toward the tail section 20 causing the snowmobile 50 to take on a nose high attitude, as the hill climb continues, this nose high attitude will often result in loop-out, rolling over backwards, loss of forward momentum and/or drive, etc.

Similarly, in a deep powder scenario, as the traverse commences, normal rear track shock assembly 38 settings can allow the rear suspension assembly 30 and track 32 to close toward the tail section 20 causing the snowmobile 50 to take on a nose high attitude, as the traverse continues, the nose high attitude will result in trenching, tunneling, loss of forward momentum and/or drive, a crash, etc.

One embodiment utilizes the user interface 205 (in one embodiment, a two position switch) coupled to the rear track shock assembly 38 of the snowmobile 50 to provide this quick and easy tail hardening. For example, when the user encounters an environment (such as discussed above), the user would simply manipulate user interface 205 (e.g., flip it, push it, turn it, etc. to the firm position) which would cause the rear track shock assembly 38 to move to a firmer, firmest, and/or lockout state. In so doing, the firming of the rear track shock assembly 38 would remove an amount of flex from the rear suspension assembly 30 which would stop and/or reduce the rear suspension assembly 30 from closing toward the tail section 20 thereby stopping the snowmobile 50 from taking on a nose high attitude, and in so doing, reduce or remove loop-out, sinking, tunneling, or the like, while allowing the machine to maintain the connection between the terrain and the tread.

In one embodiment, after the terrain had been traversed, the hill had been climbed, or as the user desires, the user would then manipulate the user interface 205 (e.g., flip it, push it, turn it, switch it, etc. to the not firm position) which would cause the rear track shock assembly 38 to unlock and return to its regular compression damping settings.

In one embodiment, snowmobile 50 includes one or more electronically actuated components, interactive components, and/or control features such as one or more of a user interface 205, active and/or semi-active shock assemblies (e.g., front track shock assembly 36, rear track shock assembly 38, and front shock assemblies 37), a controller, one or more sensor(s), a display, a power source, smart components, and the like.

In general, the one or more sensor(s) could be used to monitor and/or measure things such as temperature, voltage, current, resistance, noise (such as when a motor is actuated, fluid flow through a flow path, engine knocks, pings, etc.), positions of one or more components of snowmobile 50 (e.g., shock positions, ride height, pitch, yaw, roll, etc.), and the like. In one embodiment, the one or more sensor(s) could be forward looking terrain, vibrations, bump, impact event, angular measurements, and the like.

Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

Wired

In one embodiment, there is a wired communication connection (such as via a wiring harness or the like) between the one or more electronically actuated components, interactive components, and/or control features. For example, in one embodiment, the user interface 205 has a wired connection with the electronic valve in the rear track shock assembly 38 via a wiring harness and any adjustable aspect inputs received at the electronic valve (e.g., the manual lockout) would be received over the wired connection.

In one embodiment, power might also be received over the wired connection. For example, the motor (solenoid, or the like) that operates electronic valve would receive its power from a power source coupled with the wiring harness (e.g., the snowmobile power supply, a power supply incorporated with user interface 205, a power supply coupled with another component, a reserve or extra power supply for auxiliary components, or the like).

Although shown in certain locations in FIG. 1, in accordance with one embodiment, in other embodiments, one, some, or all of the components shown in FIG. 1 could be located in other locations. For example, one, some, or all of the components could be located on the sides of components, at the handlebars, at a foot peg (or footwell), carried by the rider if it is wireless, located on a mount attached to a portion of the snowmobile 50, etc. Thus, the use of the locations of components as shown in FIG. 1 is indicative of one embodiment, which is provided for purposes of clarity.

Wireless

In one embodiment, the electronic valve of rear track shock assembly 38 will be in wireless communication with user interface 205 without requiring a wiring harness and any adjustable aspect inputs received at the electronic valve (e.g., the manual lockout) would be received over the wireless connection.

In one embodiment, the electronic valve and/or rear track shock assembly 38 would include its own power source and the motor (solenoid, or the like) that operates the electronic valve would receive its operating power therefrom. In other words, the electronic valve and/or rear track shock assembly 38 would be a self-contained unit which would be able to receive and carry out changes transmitted from user interface 205.

Hybrid Wired and Wireless

In one embodiment, the communications between the one or more components are a combination of wired and wireless connectivity.

For example, in one embodiment, electronic valve of rear track shock assembly 38 is in wireless communication with user interface 205 and any adjustable aspect inputs would be received over the wireless connection. However, the motor (solenoid, or the like) that operates the electronic valve of rear track shock assembly 38 would receive its power from a power source via a wiring harness.

In one embodiment, the electronic valve and/or rear track shock assembly 38 would include its own power source and the motor (solenoid, or the like) that operates the electronic valve of rear track shock assembly 38 would receive its operating power therefrom.

Figure 2:
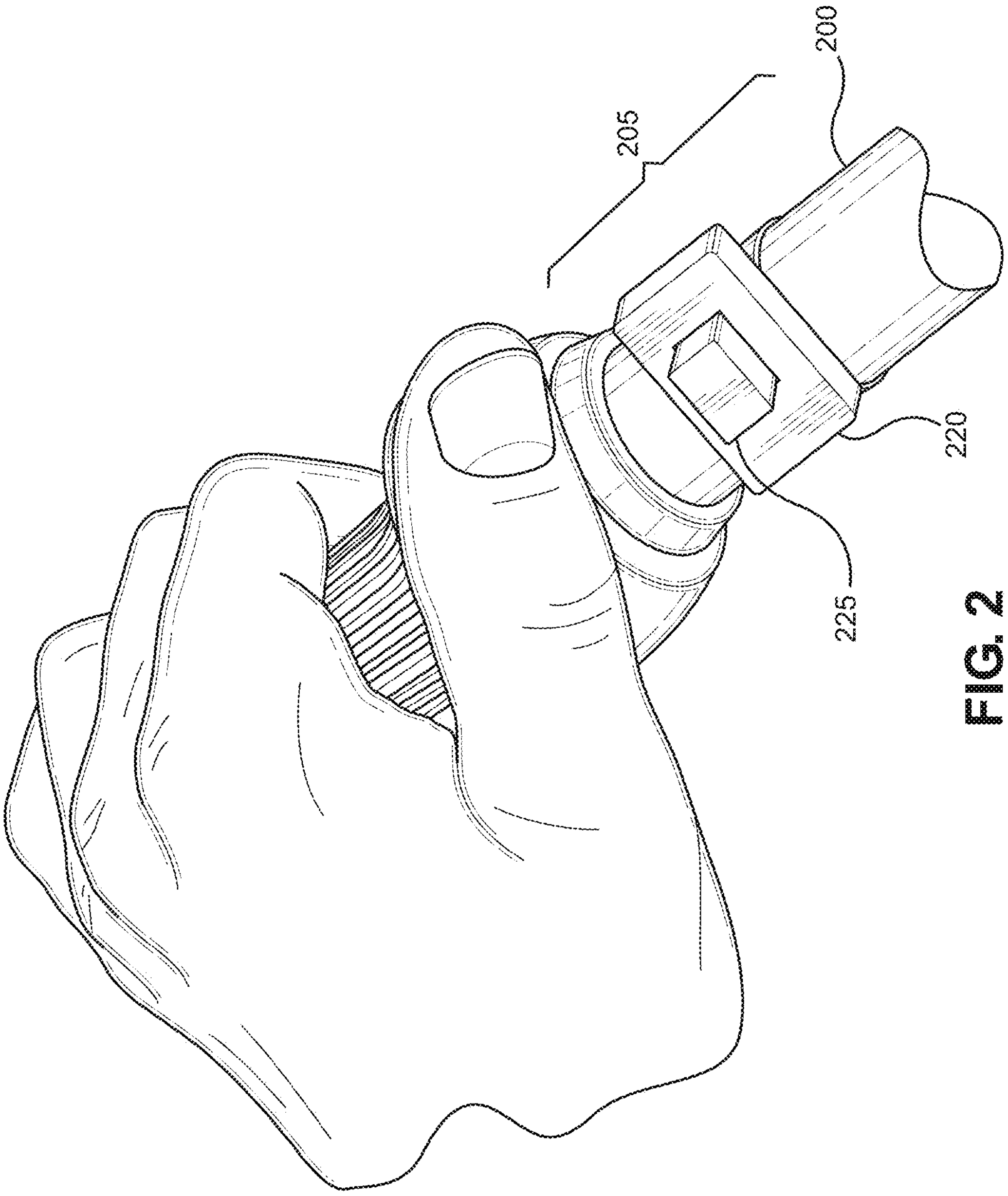
FIG. 2 is a perspective view of a user interface for the electronic valve of the rear track shock assembly, in accordance with an embodiment.

With reference now to FIG. 2, a perspective view of a user interface 205 is shown in accordance with an embodiment. In one embodiment, user interface 205 is provided in a location convenient for user manipulation during vehicle operation. In one embodiment, user interface 205 is provided on the handlebar 200 of the snowmobile 50 (or other part of snowmobile 50 that is reachable during use). In one embodiment, user interface 205 is coupled with handlebar 200 via a clip or other retaining device. In one embodiment, user interface may be, but is not limited to, a voice activation device, a GPS device having stored map, a smart phone, smart device, lever, button, or the like. Moreover, although the user interface 205 is shown coupled with handlebar 200. In another embodiment, the user interface 205 could be located elsewhere, such as, but not limited to, on another portion of the snowmobile frame 119, on a mount coupled with the snowmobile 50, worn as a smart device, carried by the rider, or the like.

In one embodiment, such as when snowmobile 50 is minimally upgraded with the electronic valve of rear track shock assembly 38, user interface 205 will only include manual lockout communications component 220 with a manually operated button 225 (or switch, knob, lever, trigger, or the like) the operation of which allows the user to remotely lock/unlock the rear track shock assembly 38 at will. It should be understood that in an embodiment, there may be only a single control, or in an embodiment there may be a set of controls.

In one embodiment, when the user interacts the user interface 205, a signal is sent from the user interface 205 to the electronic valve of rear track shock assembly 38. For example, when button 225 is operated by a user, manual lockout communications component 220 will send a signal to the electronic valve of rear track shock assembly 38. In one embodiment, the signal will either cause the electronic valve of rear track shock assembly 38 to transition to a locked out state, thereby locking out the rear track shock assembly 38, or it will cause the electronic valve of rear track shock assembly 38 to transition to a non-locked out state, thereby releasing the rear track shock assembly 38 from being manually locked out and returning it to its normal damping performance settings.

In one embodiment, communications component 220 will provide wireless communications between the user interface 205 and the electronic valve of rear track shock assembly 38. In one embodiment, communications component 220 will provide a wired communication between the user interface 205 and the electronic valve of rear track shock assembly 38.

In one embodiment, such as, for example, when snowmobile 50 has a fully (or partially) active suspension setup with the electronic valve of rear track shock assembly 38, user interface 205 will include an iQS switch and manual lockout communications component 220 with button 225 (or switch, knob, lever, etc.).

In one embodiment, when the lockout mode is manually selected, each of the front shock assemblies 37 and the front track shock assembly 36 would remain in their given configuration while the rear track shock assembly 38 would be locked out.

Figure 3:
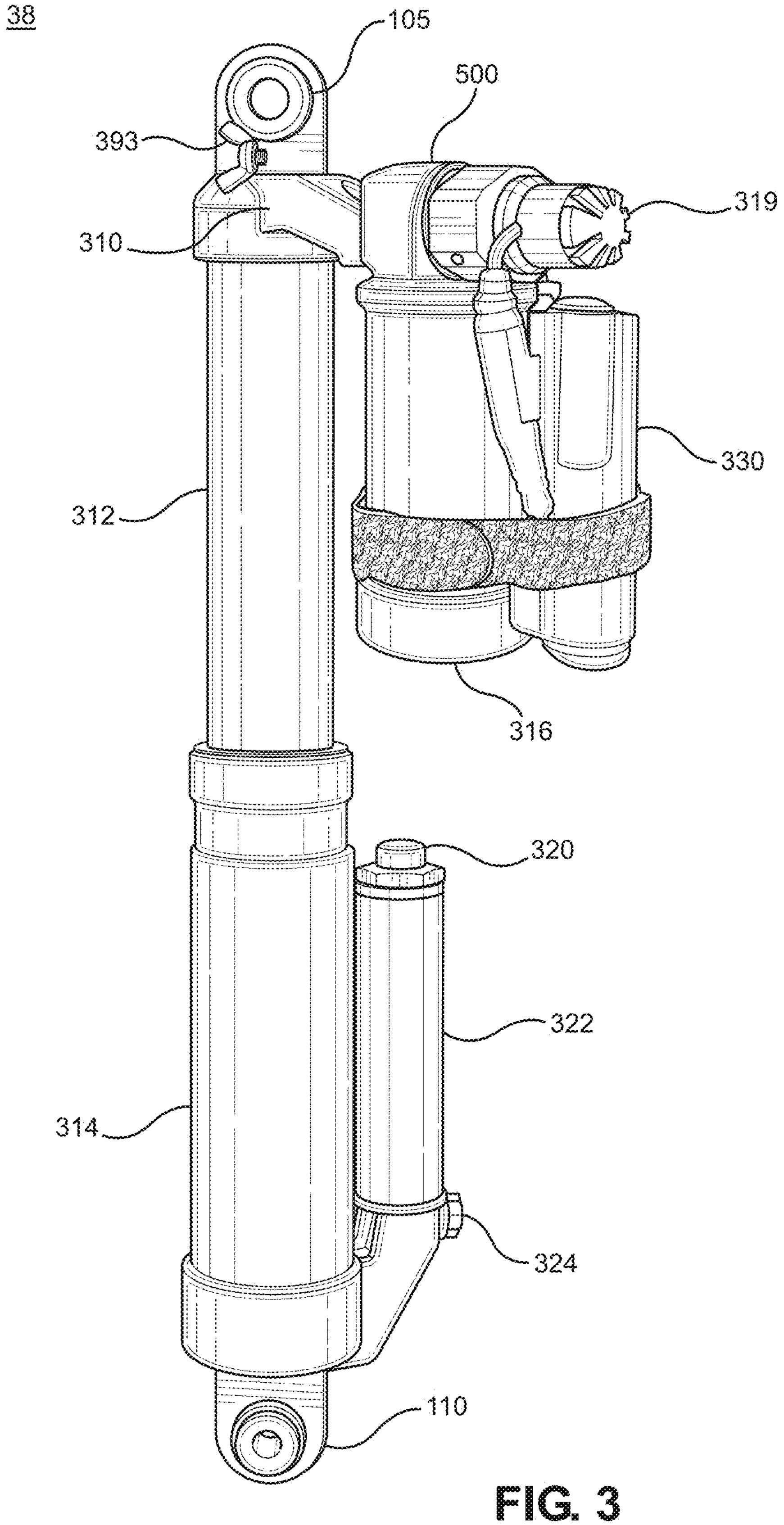
FIG. 3 is a perspective view of the rear track shock assembly with an electronic valve, in accordance with an embodiment.

Referring now to FIG. 3, a perspective view of the rear track shock assembly 38 with an electronic valve 500 is shown in accordance with one embodiment. In one embodiment, the rear track shock assembly 38 is a FOX load optimizing air technology (FLOAT) air shock assembly with a reservoir (hereinafter "air shock assembly"). In general, the air shock assembly is a high-performance shock assembly that use air as springs, instead of heavy steel coil springs or expensive titanium coil springs.

In general, rear track shock assembly 38 includes attachment features such as, in one embodiment, a chassis mount (e.g., upper eyelet 105) and a rear suspension mount (e.g., lower eyelet 110) which allow the rear track shock assembly 38 to be coupled between the unsprung portion of the suspension (e.g., the framework and components of the rear suspension between track 22 and the terrain) and the frame 5.

In one embodiment, rear track shock assembly 38 includes body 312, an expansion component (e.g., main air chamber 314) providing some type of expansive (or spring) force on rear track shock assembly 38, and a main air valve 324 for adding or removing air from main air chamber 314. In one embodiment, the rear track shock assembly 38 also includes body cap 310, and a reservoir 316 fluidly coupled with the body 312.

In one embodiment, rear track shock assembly 38 optionally includes an adjustable rebound damping valve 393. In one embodiment, rear track shock assembly 38 optionally includes a compression adjuster knob 319.

In one embodiment, rear track shock assembly 38 includes an optional extra volume (Evol) chamber 322 with an Evol air valve 320 (similar in function to main air valve 324 described herein). In one embodiment, the Evol chamber 322 allows the available air volume of main air chamber 314 of rear track shock assembly 38 to be changed on the fly, e.g., while the vehicle is in operation. In one embodiment, the change in available air volume can be performed by a user manually adjusting a lever (turning a knob, or the like) on rear track shock assembly 38 or in another location that is communicatively coupled with, but possibly remote from, the rear track shock assembly 38 such that it is easier for a user to reach while operating the vehicle.

In one embodiment, the change in available air volume is controlled by a user. In one embodiment, the change is controlled automatically by a control system on or connected with the vehicle. In one embodiment, the change to the air volume can be controlled by an automated system, while also receiving control inputs from the user manually and/or electronically.

In one embodiment, by using a main air chamber 314 and the Evol chamber 322, the air spring style rear track shock assembly 38 is lightweight and progressive. The progressive aspect occurs during the increase in spring force and travel. For example, as the air shock is compressed in a compression stroke, the spring force increase is provided by the body 312 reducing the volume of the main air chamber 314 which compresses the air therein. As the air shock is further compressed (such as during the second half of the shock travel or wherever the tuned air shock assembly is set to begin using the Evol chamber), the Evol chamber can be used to add to the spring force increase being generated by the additional compression of the air in the main air chamber 314. Thus, as the air shock travel through its compression range, the spring force will build progressively, such that any harsh bottoming of the suspension is virtually eliminated thereby providing a "bottomless" feel.

Moreover, because the main air chamber 314 and Evol chamber 322 are separated, they can be independently tuned. However, since they also work together in the described progressive fashion, the range of the combined tuning is greater than that of either alone. Thereby providing adjustability for performance across a wide variety of terrain, riding style, and user weights.

In general, adjusting the pressure in the main air chamber 314 is similar to changing a tender, and/or secondary springs, and/or the crossover spacers on a coil-over shock. Thus, adjusting the pressure in the main air chamber 314 will adjust ride height. In contrast, adjusting the pressure in the Evol chamber 322 is similar to changing a main spring on a coil-over shock, that is, it will help control bottom out and chassis roll.

Although the rear track shock assembly 38 in one embodiment is an air shock style shock assembly. In another embodiment, the rear track shock assembly 38 is a coil-over shock assembly, such as, for example, a FOX 2.0 zero QS3-R shock assembly with a velocity-sensitive shimmed damping system, one or more coil-over springs, a spring preload adjuster, and a reservoir. In another embodiment, the rear track shock assembly 38 may be another type of shock assembly such as, but not limited to, a stand-alone fluid damper assembly, a coil sprung adjustable shock assembly, an air sprung fluid damper assembly, a strut shock, or the like.

Referring still to FIG. 3, in one embodiment, rear track shock assembly 38 includes a wireless controller 330 which receives data transmissions from user interface 205. In one embodiment, wireless controller 330 signals a motive component coupled with the control valve (or electronic valve 500). In one embodiment, wireless controller 330 is part of the motive component coupled with the control valve (or electronic valve 500). In one embodiment, the motive component causes the control valve to adjust a compression stiffness of the shock assembly.

In one embodiment, the electronic valve 500 is electronically actuated. For example, user interface 205 provides a signal to the motive component to stiffen and/or lockout said shock assembly or return said shock assembly to a pre-stiffened and/or non-locked out configuration. In one embodiment, the electronic valve 500 is mechanically actuated. In one embodiment, the electronic valve 500 is both mechanically and electronically actuated.

Figure 4A:
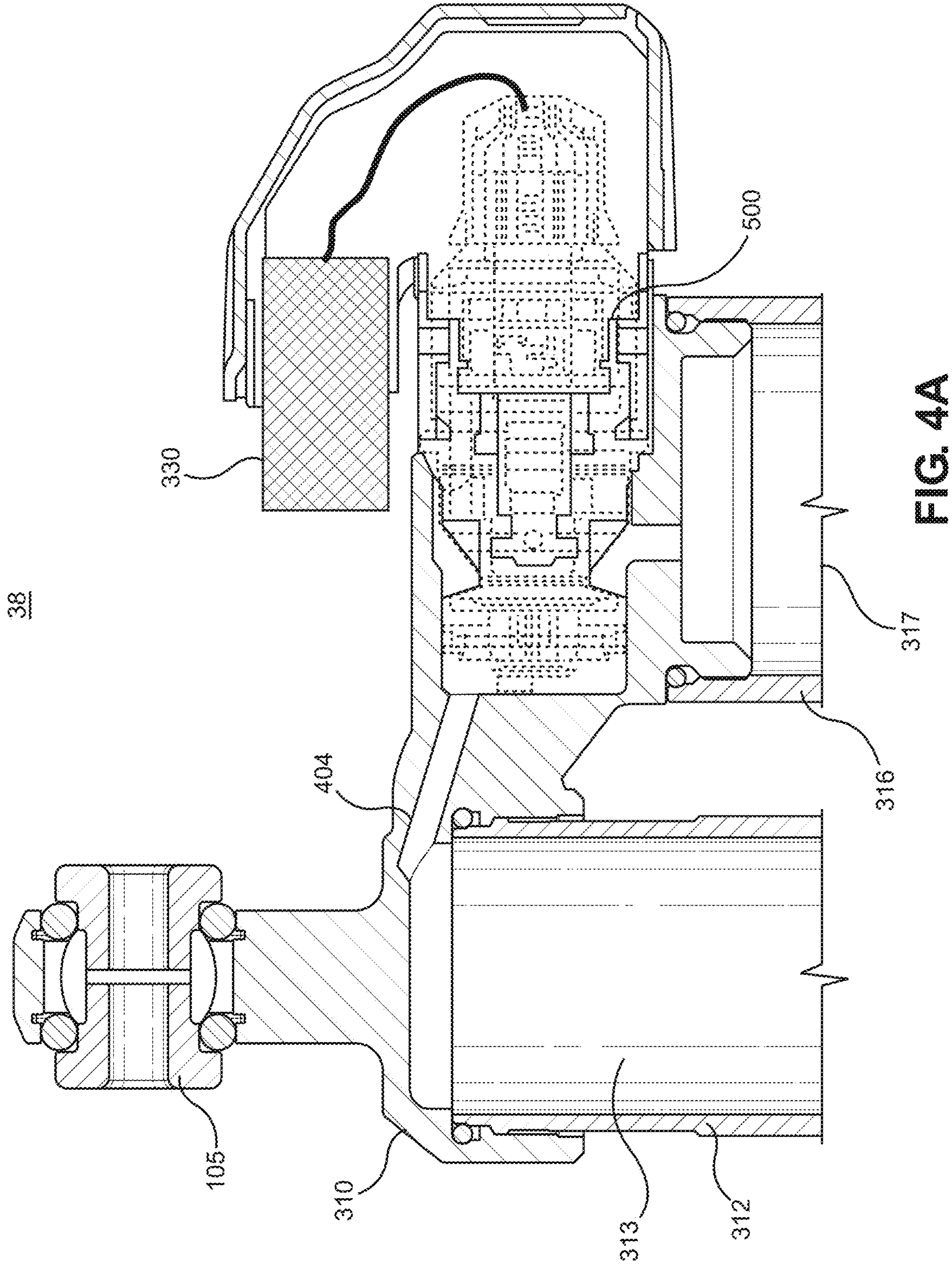
FIG. 4A is a cross-section view of a portion of the rear track shock assembly with the electronic valve illustrating the location of the electronic valve, in accordance with an embodiment.

Referring now to FIG. 4A, a cross-section view of the top portion of the rear track shock assembly 38 with the electronic valve 500 of FIG. 3, illustrating the location of the electronic valve 500 and an optional location for wireless controller 330 is shown in accordance with an embodiment. In one embodiment, the cross-sectional view also shows a portion of the chamber 313 of body 312 that holds the working fluid, a portion of the reservoir chamber 317 of reservoir 316 that holds the working fluid, and the flow path 404 in the body cap 310 therebetween. In addition, the electronic valve 500 for controlling the flow rate is shown within flow path 404.

Referring now to FIGS. 3 and 4A, in one embodiment, body 312 has an internal chamber 313 filled with a working fluid (e.g., high viscosity index shock oil, etc.), an expansion component (e.g., main air chamber 314) providing some type of expansive (or spring) force on rear track shock assembly 38, a main air valve 324 for adding or removing air from main air chamber 314, and a piston coupled with a piston shaft, where the piston is located somewhere within the internal chamber 313 of body 312. In one embodiment, when installed, the resting length of the mounted rear track shock assembly 38 is maintained in compression by the weight of the body it is suspending (e.g., the sprung portion of snowmobile 50), and in expansion by the "spring" force produced by the expansion component (e.g., main air chamber 314).

In one embodiment, reservoir 316 is fluidly coupled with the body 312 via a flow path(s) 404 through body cap 310. In one embodiment, the reservoir 316 has a reservoir chamber 317 that is divided by an internal floating piston (IFP). In one embodiment, one side of the IFP divided reservoir chamber 317 is filled with a pressurized gas (e.g., nitrogen, or the like) and the other side of reservoir chamber 317 is fluidly coupled with chamber 313 of body 312 via flow path 404 and contains working fluid. In general, the IFP keeps the pressurized gas from mixing with the working fluid and/or reaching the flow path 404.

In operation, when the vehicle encounters a bump, rear track shock assembly 38 is compressed causing the piston and piston shaft to move further into chamber 313 of body 312 (e.g., the compression stroke). After the compression stroke, the expansion component (e.g., main air chamber 314) which was compressed by body 312 moving thereinto, acts to push body 312 back out of the chamber 314, causing the piston and piston shaft to move back toward their original location within the chamber 313 of body 312 (e.g., the rebound stroke).

During the compression stroke, some of the working fluid in chamber 313 of body 312 is displaced (due to the reduced volume within chamber 313 of body 312 caused by the incursion of the piston shaft). This displaced working fluid will flow from chamber 313 of body 312 through the flow path 404 in the body cap 310 to the reservoir chamber 317. As the working fluid fills the reservoir chamber 317, it will cause the IFP to move further into reservoir chamber 317 causing the pressurized gas to be further compressed, and in so doing, ensure consistent, fade-free damping in most riding conditions.

In one embodiment, the electronic valve 500 is located in the body cap 310 flow path 404 between the chamber 313 of body 312 and the reservoir 316. In one embodiment, electronic valve 500 is used to control the flow of the working fluid through the flow path 404 during the compression stroke. For example, in a most basic configuration, electronic valve 500 will either allow the working fluid to flow through flow path 404 (e.g., allowing the rear track shock assembly 38 to operate in its established envelope), or it will affectively close flow path 404 causing a lockout or maximum firmness setting of the rear track shock assembly 38 during the compression stroke.

In one embodiment, making an adjustment to the electronic valve 500 will change the flow rate of the working fluid flowing through flow path 404 causing a corollary adjustment of one or more damping characteristics of the rear track shock assembly 38 during the compression stroke.

In one embodiment, electronic valve 500 receives adjustment input(s) from user interface 205. In one embodiment, electronic valve 500 receives adjustment input(s) from a compression adjuster knob 319. In one embodiment, electronic valve 500 receives adjustment input(s) from user interface 205 and compression adjuster knob 319.

Figure 4B:
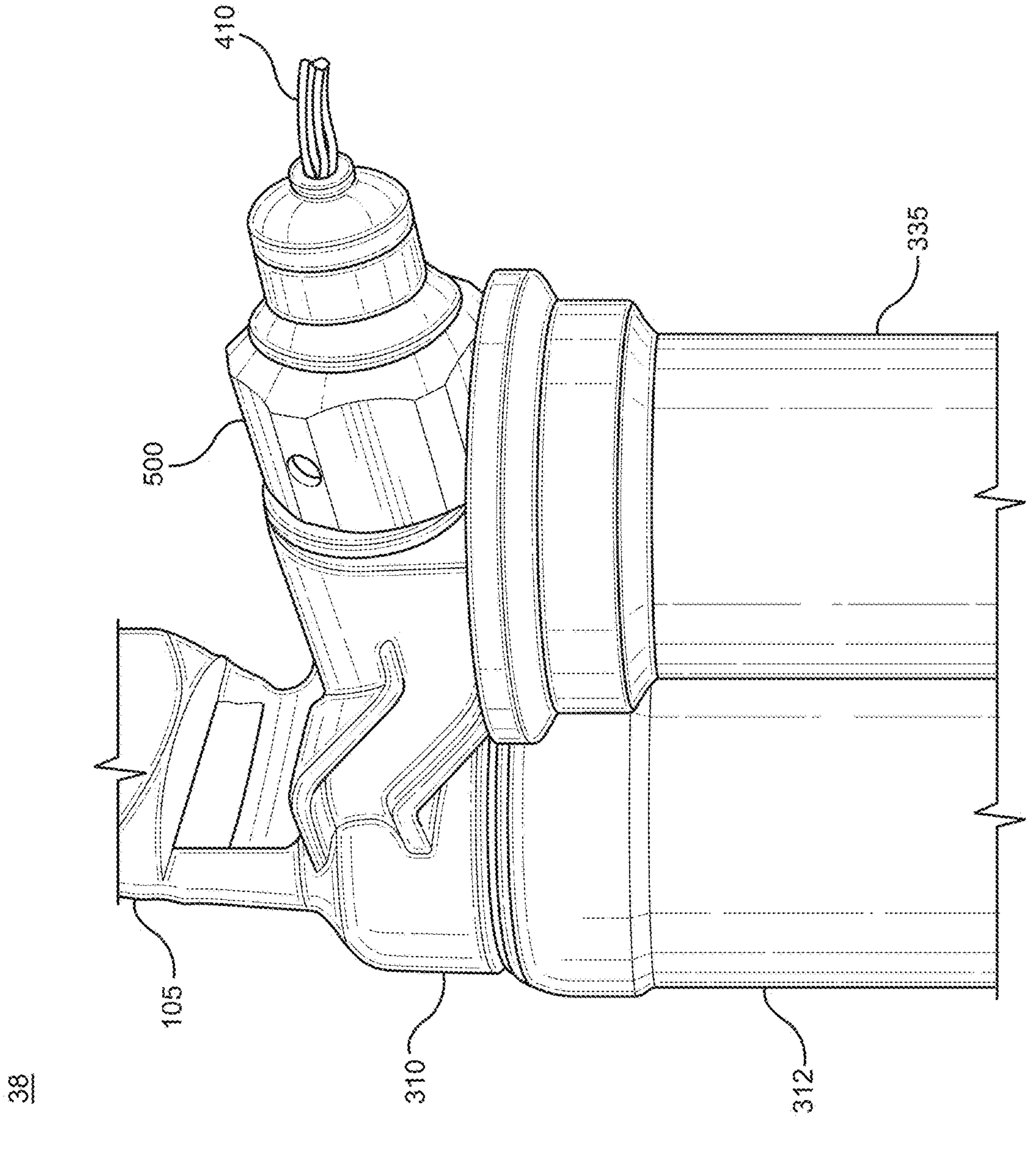
FIG. 4B is a perspective view of the rear track shock assembly with a wired electronic valve, in accordance with an embodiment.

With reference now to FIG. 4B, a perspective view of top portion of the rear track shock assembly 38 with the electronic valve 500 of FIG. 3, having a wire 410 extending from the electronic valve 500 is shown in accordance with an embodiment.

In one embodiment, the wire 410 is the wired connection with user interface 205.

In one embodiment, one, some, or all of front shock assemblies 37 and/or front track shock assembly 36 include the same or similar components as described in the rear track shock assembly 38 discussion provided herein. However, as previously stated, the discussion uses examples based on the rear track shock assembly 38 for purposes of clarity.

Moreover, although components of FIGS. 3, 4A, and 4B, are shown in given locations in accordance with one embodiment, in other embodiments, one, some, or all of the components shown in FIGS. 3 4A, and 4B could be located in other locations, one or more components could be separated into two or more pieces and dispersed, etc. The use of the locations of the components as shown in FIGS. 3, 4A, and 4B are indicative of one embodiment, which is provided for purposes of clarity.

Figure 5A:
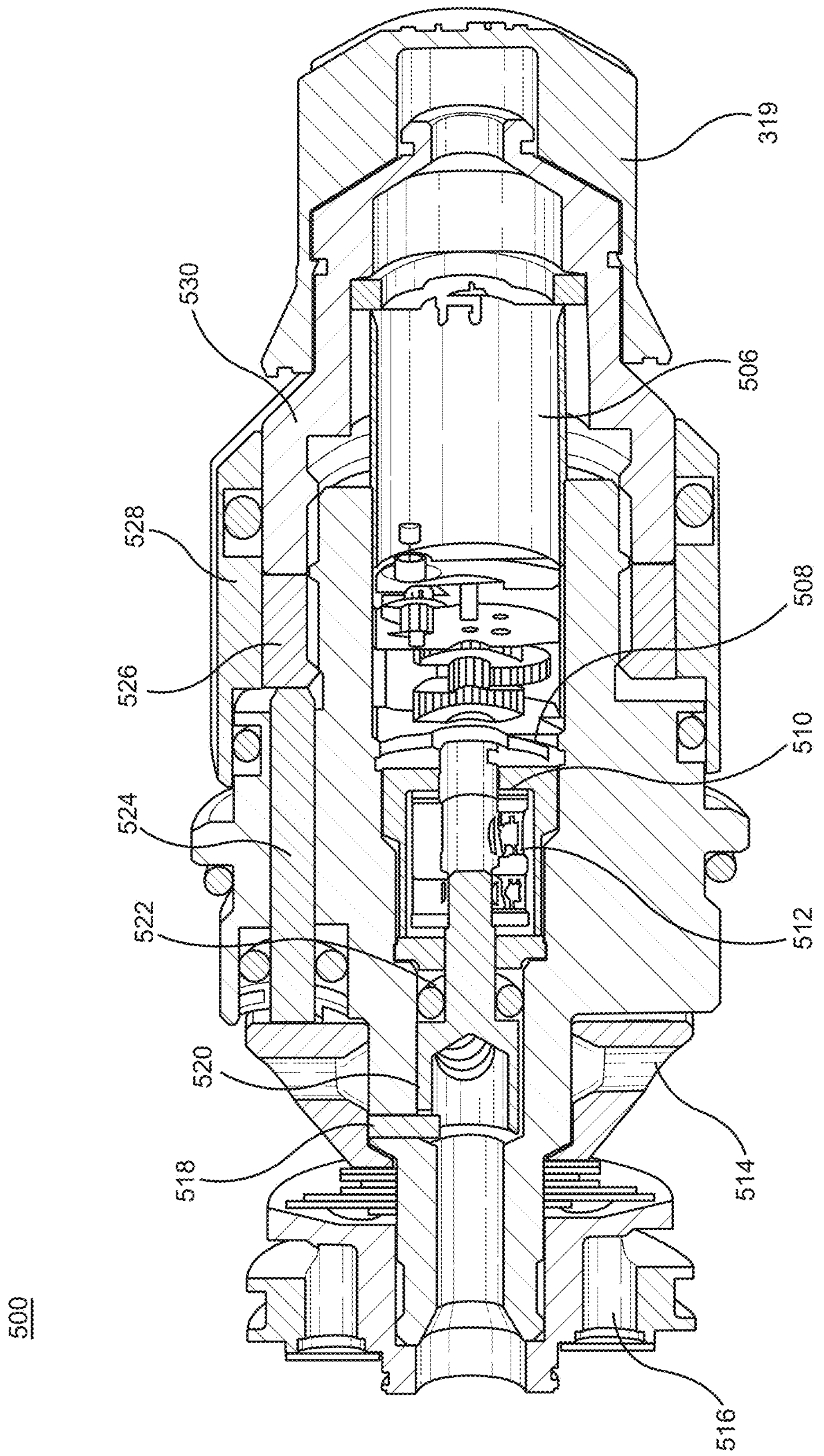
FIG. 5A is a cross-section view of a rotary spool style electronic valve, in accordance with an embodiment.

Referring now to FIG. 5A, a cross-section view of a rotary spool style electronic valve 500 is shown in accordance with an embodiment.

In one embodiment, rotary spool style electronic valve 500 includes an end cap/preload ring stop 530, preload knob 528, threaded preload ring 526, preload pins 524, O-ring/Back up 522, compression adjuster knob 319, motive component 506, coupled retaining ring 508, PRFE thrust washers 510, motive component coupler 512, preload plate 514, threaded piston 516, rotary spool 520 (or control valve-which in one embodiment is pressure balanced), and rotary spool stop 518 (or control valve movement limiter).

In one embodiment, the rotary spool 520 is designed such that the angular rotation between the closed state and the start of flow (and/or the open state and the beginning of the closing of the flow) is minimized. In one embodiment, the flow path through rotary spool 520 is circular. In another embodiment, the flow path through rotary spool 520 is another shape or combination of shapes. In one embodiment, instead of using a single sized flow path through rotary spool 520, a grid of holes are used as the flow path through rotary spool 520.

In one embodiment, rotary spool 520 has a throw of approximate 90 degrees between its open and closed positions. In one embodiment, the rotary spool 520 is a short throw valve where the difference between the open and the closed position is approximately 180 degrees or less. In one embodiment, the rotary spool 520 is a single rotation valve where the difference between the open and the closed position is approximately 360 degrees or less.

In one embodiment, the electronic valve 500 includes rotary spool 520 and a rotary motive component 506, such that all of the motion is rotary and as such, there is no need for any rotary to linear conversion. In other words, in one embodiment, there is no rotary to linear transmission required. E.g., there is no need to convert the rotating motion from a motor to linear actuation motion.

Therefore, in one embodiment, since electronic valve 500 relies only on rotational motion, no axial extension is needed other than the size of the electronic valve 500. In one embodiment, to provide an even smaller axial footprint, the output shaft from motive component 506 is used as to drive rotary spool 520.

In one embodiment, the feature of the rotary spool 520 that interfaces with rotary spool stop 518 is used to key the flow path through the rotary spool 520 to flow path 404.

In one embodiment, the rotary spool 520 of electronic valve 500 is (effectively) a two-state valve. In other words, the rotary spool 520 is an on/off component.

In one embodiment, motive component 506 is a brushed DC motor with a gearbox. In one embodiment, motive component 506 is a stepper motor, brushless motor, coreless motor, solenoid, or the like. In one embodiment, a control process is employed which controls the motive component 506 ensuring it turn the rotary spool 520 the proper amount. In one embodiment, the control process does not require the use of visual indices, motion measurement tools, or the like.

Figure 6:
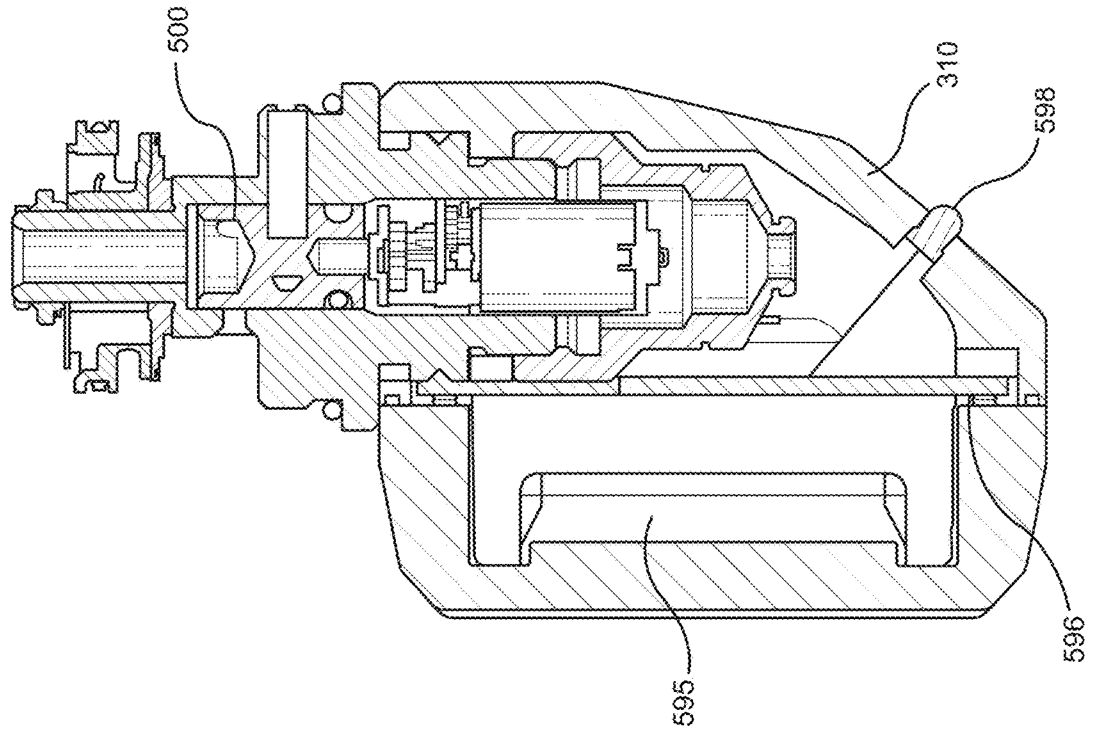
FIG. 6 is a cut-away view of a portion of rear track shock assembly with electronic valve, in accordance with an embodiment.

With reference now to FIG. 6, a cut-away view of a portion of rear track shock assembly 38 with electronic valve 500, a power source 595, and a PCB 596 (which in one embodiment includes a microcontroller and motor controller) are shown in accordance with an embodiment. In one embodiment, FIG. 6 includes an LED 598.

With reference now to FIGS. 5A and 6, in one embodiment, the control process utilizes the wireless radio (at the user interface 205), a microcontroller and a motor controller (in one embodiment, both the microcontroller and the motor controller are located other than user interface 205 and closer (if not physically coupled with) motive component 506). In one embodiment, microcontroller and motor controller are located on the same PCB 596. In one embodiment, the wireless radio senses an actuation signal from the trigger unit (e.g., the user pushing one of the buttons or the like on user interface 205) which, in one embodiment, is mounted at handlebar 200. As described herein, the pushing of the button is used to indicate a desired change to the shock assembly tune. When the actuation signal is received from the user interface 205 to the microcontroller, the microcontroller sends a signal to the motor controller. In one embodiment, the motor controller allows power from the power source (such as 595 or the like) to be applied to the DC motive component 506. In one embodiment, full voltage from the power source is supplied to the motive component 506. In one embodiment, full voltage from the power source is supplied such that the motive component 506 is spun as quickly as possible. In one embodiment, less than full voltage from the power source is supplied to the motive component 506. In one embodiment, one or more components of the control process (e.g., microcontroller, motor controller, or the like) then monitor for a condition that occurs during the operation of motive component 506 (e.g., current, proxy current, time, resistance, voltage, temperature, other sensors input, or the like) that satisfies a predetermined criteria. When the condition is met, the power to the motive component 506 is removed.

For example, in one embodiment, as power is provided to the motive component 506, the motor controller senses the current provided to the motive component 506 using a circuit integrated into the motor controller. In general, the current (or other measurable aspect) varies over time (e.g., initially spiking to get the motor turning, then dropping while the valve moves, then spiking again when the valve is hits a hard stop). In one embodiment, the operating current provided to the motive component 506 is compared to one or more pre-determined values (or current thresholds) stored in the memory of the microcontroller. In one embodiment, when the sensed current meets the predetermined threshold (e.g., a current threshold that represents motor stall), the microcontroller sends a signal to the motor controller to shut off the power to the motive component 506. In one embodiment, this would complete an "closed" portion of the control strategy (e.g., closing the rotary spool 520) and lockout the shock assembly. In one embodiment, as long as the user depresses the button on user interface 205, this is all that occurs. That is, power is not required to keep the rotary spool 520 in its closed position.

In one embodiment, when the user selects a different suspension tune button on user interface 205, the reverse operation occurs to open rotary spool 520. That is, the wireless radio senses that new button being pushed. The microcontroller sends a signal to the motor controller to once again allow power to be provided to the motive component 506, (however, in one embodiment, it is provided in an opposite polarity from that provided in the rotary spool 520 close operation to cause the motive component 506 to rotate in the opposite direction). Once again, the current is sensed until the current threshold criteria is met, at which point the microcontroller sends a signal to the motor controller to shut off the power to the motive component 506. In one embodiment, this would complete the "unlock" portion of the control strategy (e.g., opening the rotary spool 520). Once again, power is not required to hold the rotary spool 520 in its opened position.

In one embodiment, such as when the wireless control only utilizes the lockout feature, when the user interacts the user interface 205, a signal is sent from the user interface 205 to the electronic valve 500. As described in detail herein, the signal causes motive component 506 to rotate the rotary spool 520 within the electronic valve 500. The rotation of the rotary spool 520 causes the opening and/or closing of flow path 404 between body 312 and reservoir 316 at the location of the electronic valve 500 causing the rear track shock assembly 38 to either be put into a lockout condition or removed from a lockout condition.

In one embodiment, the use of the control process described herein to monitor and analyze the sensed current greatly reduces the complexity associated with the opening and closing of conventional electronically-actuated valves. For example, in one embodiment only two wires are required to be coupled to motive component 506. In general, the two wires provide the power to motive component 506, (e.g., completing a circuit between the power source and motive component 506). In one embodiment, the microcontroller and/or motor controller would also be included in the circuit to control the flow of power from the power source to the motive component 506.

In one embodiment, the current (or other measurable aspect) can be sensed at any desired location of the circuit. For example, in various embodiments, the current may be sensed at, but not limited to, any of the following locations, at or very near motive component 506, at a location remote from motive component 506, at the same location as the power source for motive component 506, at a control unit (such as microcontroller and/or motor controller) which controls motive component 506, at a control unit which controls other features on the vehicle (e.g., in one embodiment, the control unit is not required to control motive component 506), and the like.

In one embodiment, there is a feature (such as a cutout, lip, arm, etc.) in a portion of the rotary spool 520 that interfaces with the rotary spool stop 518 to create a hard stop (or bump stop, or the like). In various other embodiment, other aspects, features, or the like maybe used as the stopping feature of the rotation of the rotary spool 520 (such as open, closed, or the like) which would cause a current threshold to be reached. In one embodiment, the hard stop is used to control the endpoint or endpoints of motive component 506 with respect to moving/translating/rotating of some portion of rotary spool 520. Once the hard stop has restricted further moving/translating/rotating of rotary spool 520, the controller will sense a corresponding change in current (e.g., a current spike, a current drop, or other change in current) through motive component 506. In one embodiment, based upon sensing the current change, the controller stops power from being provided to motive component 506, or otherwise alters the power received by motive component 506.

In one embodiment, instead of (or in addition to) the measuring and/or monitoring of a current threshold of the motive component 506 to determine rotary spool 520 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the motive component 506 that satisfies a predetermined criteria.

For example, if the motive component 506 rotational rate for a given power is known, and the amount of desired rotation of the rotary spool 520 is also known, a timer or the like could be used to control the time the power is supplied to motive component 506. For example, if motive component 506 spins at a rate of 200 rpm and the rotary spool 520 needs to be rotated 180 degrees, then the timer would let the motive component 506 operate for 0.15 seconds. In one embodiment, the timer and/or filters disclosed herein could also be used as back-up or confirmation settings to ensure against faults/transients such as where the stall current threshold is reached before the rotary spool 520 is completely open or completely closed. Thus, using any and/or all of these methods, there is no need to measure the position of the motive component 506 directly.

As a significant advantage over conventional approaches, the various sensing embodiments, are not required to use visual indices, motion measurement tools, or the like, to determine that motive component 506 has completed a desired movement/translation/rotation of rotary spool 520. As a result, embodiments do not require the additional complex features, additional wires (e.g., additional control wires between motive component 506 and a controller dedicated and/or used to control motive component 506). Instead, one embodiment is able to control motive component 506 using the wires providing power to motive component 506, or otherwise altering the power received by motive component 506. Additionally, as physical space tends to be constrained in various vehicles, such as, for example, in the rear suspension of snowmobile 50, fewer wires and components will occupy far less physical space than is required by conventional electronically actuated suspension assemblies. Moreover, although the discussion above is provided in light of controlling a rear track shock assembly 38, other embodiments are well suited to being utilized in conjunction with different components such as, but not limited to, each of the front shock assemblies 37, the front track shock assembly 36, and various other vehicle components/features.

In one embodiment, although a wired connection between the motor controller and motive component 506 is disclosed as one method for monitoring and or controlling the power to motive component 506, other embodiments are well suited to using a wireless communication to communicate between, for example, the controller and motive component 506.

Figure 5B:
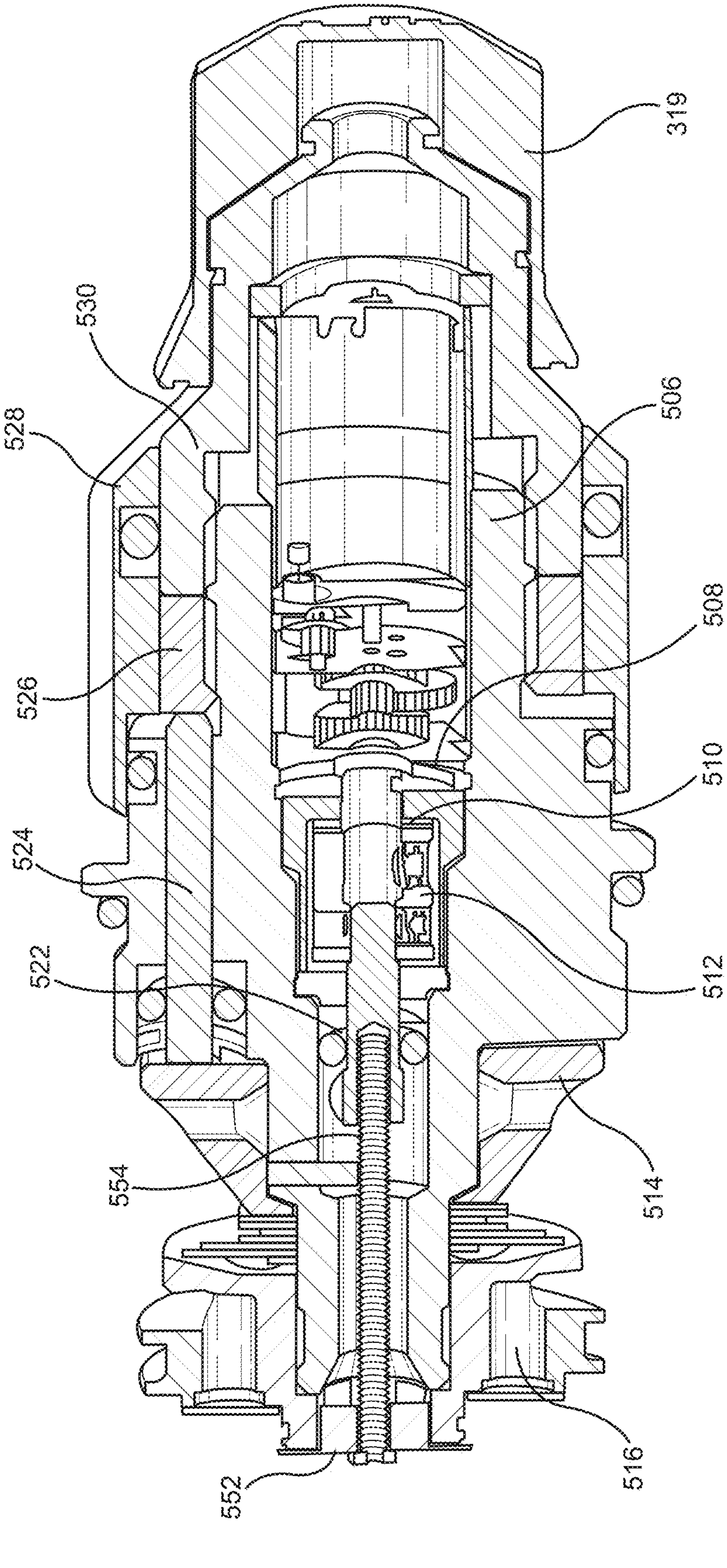
FIG. 5B is a cross-section view of a check shim style electronic valve, in accordance with an embodiment.

With reference now to FIG. 5B, a cross-section view of a check shim style electronic valve 500 is shown in accordance with an embodiment. In general, a number of the components of check shim style electronic valve 500 are similar to those of rotary spool style electronic valve 500 FIG. 5A, and as such, only the different components are discussed herein. The discussion of the components of FIG. 5B that are similar to those of FIG. 5A is not repeated for purposes of clarity, but is instead incorporated by reference in its entirety.

In the check shim style electronic valve 500 instead of having rotary spool 520 (which in one embodiment is pressure balanced), and rotary spool stop 518, in one embodiment, check shim style electronic valve 500 uses a lead screw 554 (control valve) and a check shim/guide 552 (or control valve movement limiter) to open or close the flow path 404.

With reference now to FIGS. 5B and 6, in one embodiment, when the user interacts the user interface 205, a signal is sent from the user interface 205 to the electronic valve 500. As described in detail herein, the signal causes motive component 506 to move the lead screw 554 within the electronic valve 500. The movement of the lead screw 554 causes the opening and/or closing of flow path 404 between body 312 and reservoir 316 at the location of the electronic valve 500, thereby causing the rear track shock assembly 38 to either be put into a lockout condition or removed from a lockout condition.

In one embodiment, the operation of lead screw 554 with respect to the check shim/guide 552 is similar to that described with respect to the rotary flow operation of FIG. 5A. That is, check shim/guide 552 is used by a control system operating motive component 506 as part of a current limit type feedback system to control the operation and rotation of lead screw 554. For example, in one embodiment, when the motive component 506 is activated, it will run in one of two directions to turn lead screw 554 (either to open or close flow path 404). In one embodiment, when a feature on the lead screw 554 encounters check shim/guide 552 for a given direction of rotation, the lead screw 554 will stop rotating. This will cause a current increase in motive component 506 as it increases current to try to move the stopped lead screw 554.

As discussed above, in one embodiment, there is a preestablished current threshold that is based on motive component 506 continuing to try to rotate the lead screw 554 after the lead screw 554 has been stopped by check shim/guide 552. In one embodiment, when the control system operating motive component 506 determines the current threshold or current limit is met by the current requirements of motive component 506, the control system will shut off the power to motive component 506. In so doing, the check valve type electronic valve 500 is able to quickly rotate the lead screw 554 without requiring any additional controllers, inputs, etc.

In one embodiment, lead screw 554 of electronic valve 500 is (effectively) a two-state valve. In other words, the lead screw 554 is an on/off component. In one embodiment, the lead screw 554 of electronic valve 500 may have intermediate states (to limit flow, such as a high flow, a medium flow, a slow flow, etc., but not at zero flow). For example, the lead screw 554 of electronic valve 500 could have intermediate settings to control flow. In one embodiment, there may be a control system (an encoder on motive component 506 with different settings thereon, etc.) to control/adjust the rotational location of the lead screw 554 into one or more intermediate states, (e.g., between on and off), to provide a regulated flow.

In one embodiment, the motive component 506 (e.g., solenoid, electric motor, stepper motor, or the like) of the electronic valve 500 receives power from a power source located locally with respect to rear track shock assembly 38. In one embodiment, the power source is integrated with the wireless controller 330. In one embodiment, the power source is located at user interface 205.

In one embodiment, electronic valve 500 may include a mechanical actuator (e.g., a cable, hydraulic line, etc.) for mechanically actuating one or more components of the electronic valve 500. In general, the operation of electronic valve 500 would be similar to the operation described above, except for the change from a motive component 506 to electronically drive one or more components of the electronic valve 500, a mechanical actuator would be used to mechanically actuate one or more components of the electronic valve 500.

In one embodiment, the mechanical actuator 481 would provide a control capability such that a user input on a user interface 205 (or similar type device) would provide a mechanical actuation of the electronic valve 500 to change the lockout state of rear track shock assembly 38.

Figure 5C:
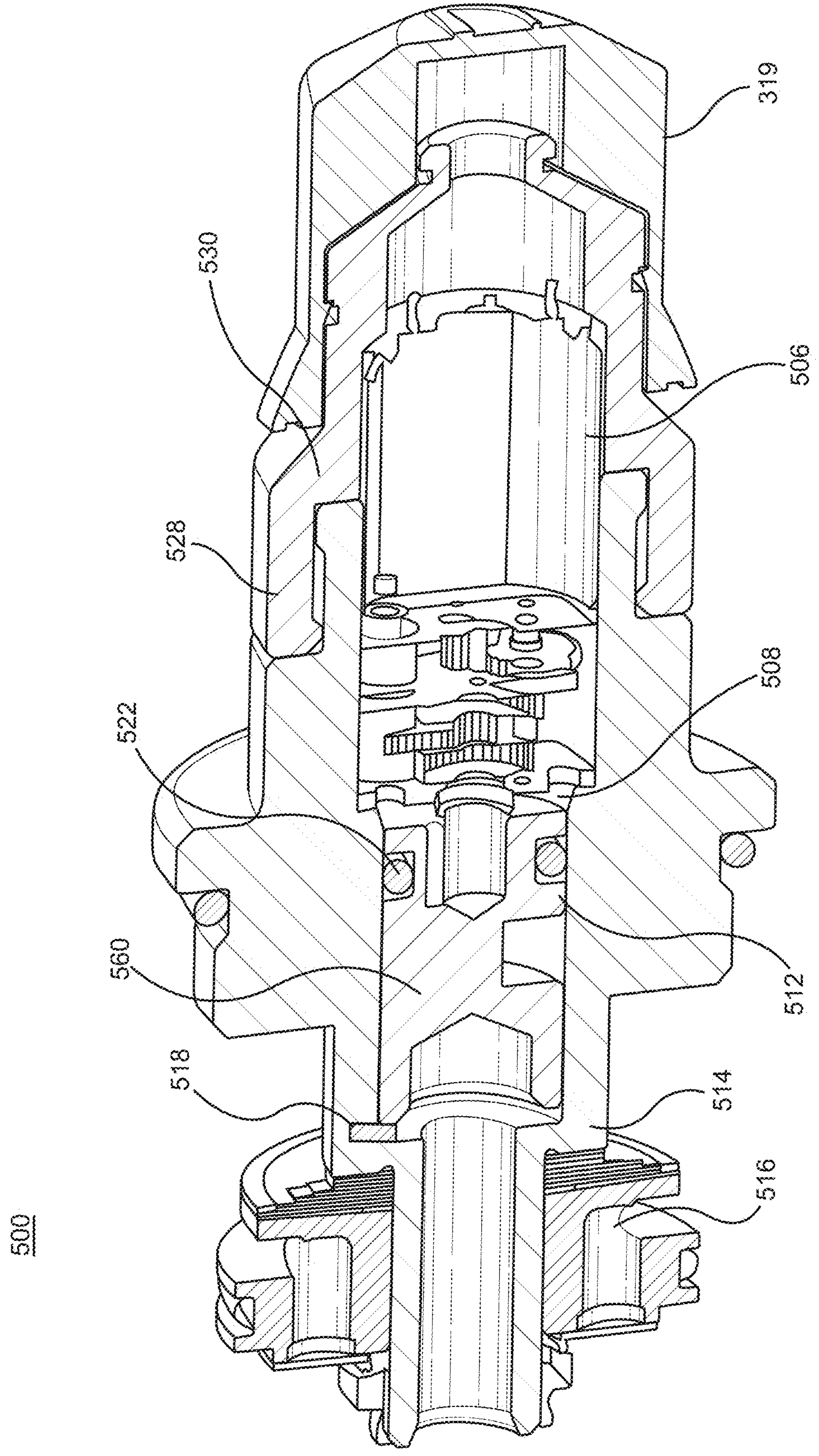
FIG. 5C is a cross-section view of a multi-state rotary spool style electronic valve, in accordance with an embodiment

Referring now to FIG. 5C, a cross-section view of a multi-state rotary spool 560 of electronic valve 500 is shown in accordance with an embodiment. In general, multi-state rotary spool 560 of electronic valve 500 has a number of intermediate states (to limit flow, such as a high flow, a medium flow, a slow flow, etc.) between the closed state and the full-open state. In general, a number of the components of multi-state rotary spool 560 of electronic valve 500 are similar to those of rotary spool style electronic valve 500 FIG. 5A, and as such, only the different components are discussed herein. The discussion of the components of FIG. 5C that are similar to those of FIG. 5A is not repeated for purposes of clarity, but is instead incorporated by reference in its entirety.

In one embodiment, multi-state rotary spool 560 of electronic valve 500 includes one or more intermediate settings in addition to the softest and the lockout positions to control flow.

Figure 5D:
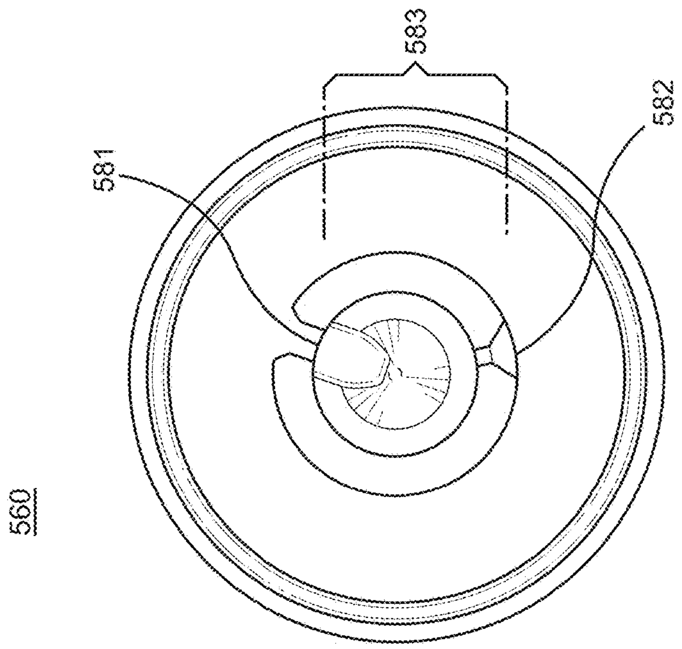
FIG. 5D is a front cut-away view of the multi-state rotary spool of FIG. 5C, in accordance with an embodiment.

With reference now to FIG. 5D, a front cut-away view of the multi-state rotary spool 560 is shown in accordance with an embodiment. In one embodiment, multi-state rotary spool 560 has a soft setting 581 feature, a lockout setting 582 feature, and a firmness range 583 that becomes increasingly firmer as the multi-state rotary spool 560 is rotated from the soft setting 581 to the lockout setting 582. In one embodiment, soft setting 581 feature is on one end stop and lockout setting 582 feature is on another end stop.

In one embodiment, soft setting 581 feature and lockout setting 582 feature are set 150 degrees apart. In another embodiment, they may be set at a different range. The use of 150 degrees is one embodiment and provided for purposes of clarity in the following examples.

With reference now to FIGS. 5C-6, one embodiment of a control process is disclosed. In general, the control process for the valve of FIG. 5C is similar to that of the discussion of the control and operation of FIG. 5A. As such, it is not repeated for purposes of clarity.

In general, during operation, the controller may overshoot to each end stop to change between the soft setting 581 and lockout setting 582 of multi-state rotary spool 560 using the control and operation description provided in the discussion of FIG. 5A. In one embodiment, instead of (or in addition to) the measuring and/or monitoring of a current threshold of the motive component 506 to determine multi-state rotary spool 560 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the motive component 506 that satisfies a predetermined criteria.

In one embodiment, to obtain a middle firmness setting, a timer is used to time the operation of the motor such that it moves approximately half way between the soft setting 581 feature and lockout setting 582 feature in the firmness range 583. For example, if the motive component 506 rotational rate for a given power is known, and the amount of desired rotation of the multi-state rotary spool 560 is also known, a timer or the like could be used to control the time the power is supplied to motive component 506. For example, if motive component 506 spins at a rate of 200 rpm and the multi-state rotary spool 560 needs to be rotated approximately 75 degrees, then the timer would let the motive component 506 operate for 0.06 seconds. Thus, using any and/or all of these methods, there is no need to measure the position of the motive component 506 directly to put the multi-state rotary spool 560 in a softest position, a middle firmness position, or a firmest (or locked out) position.

In one embodiment, the rebound valve can use similar valving as disclosed in FIGS. 5A-6. In one embodiment, if the rebound valve is on the same shock assembly as the compression valve, the two valves may share one or more of the control components such as the power source, the microcontroller, and the like. In one embodiment, each active valve may have its own motor controller.

As stated above a significant advantage over conventional approaches, the various sensing embodiments, are not required to use visual indices, motion measurement tools, or the like, to determine that motive component 506 has completed a desired movement/translation/rotation of multi-state rotary spool 560. As a result, embodiments do not require the additional complex features, additional wires (e.g., additional control wires between motive component 506 and a controller dedicated and/or used to control motive component 506). Instead, one embodiment is able to control motive component 506 using the wires providing power to motive component 506, or otherwise altering the power received by motive component 506. Additionally, as physical space tends to be constrained in various vehicles, such as, for example, in the rear suspension of snowmobile 50, fewer wires and components will occupy far less physical space than is required by conventional electronically actuated suspension assemblies. Moreover, although the discussion above is provided in light of controlling a rear track shock assembly 38, other embodiments are well suited to being utilized in conjunction with different components such as, but not limited to, each of the front shock assemblies 37, the front track shock assembly 36, and various other vehicle components/features.

In one embodiment, although a wired connection between the motor controller and motive component 506 is disclosed as one method for monitoring and or controlling the power to motive component 506, other embodiments are well suited to using a wireless communication to communicate between, for example, the controller and motive component 506.

In one embodiment, the microcontroller/Radio is a Feather M0 with RFM69HCW packet radio (433 MHz). In one embodiment, the motor controller is a DRV8833 2 channel controller with current limiting capabilities.

In one embodiment, the user interface 205 microcontroller/Radio is a Feather M0 with RFM69HCW packet radio (433 MHz). In one embodiment, user interface 205 includes a voltage regulator such as TSR-12450. In one embodiment, the buttons on user interface 205 are momentary switches.

In one embodiment, the status of power source 595 is displayed by LED 598. For example, in one embodiment, if power source 595 is running low, LED 595 may flash. Similarly, in one embodiment, user interface 205 may include an LED that provides status information such as which mode is selected, power source information, wireless connectivity status between user interface 205 and the one or more suspension components, and the like.

Figure 7:
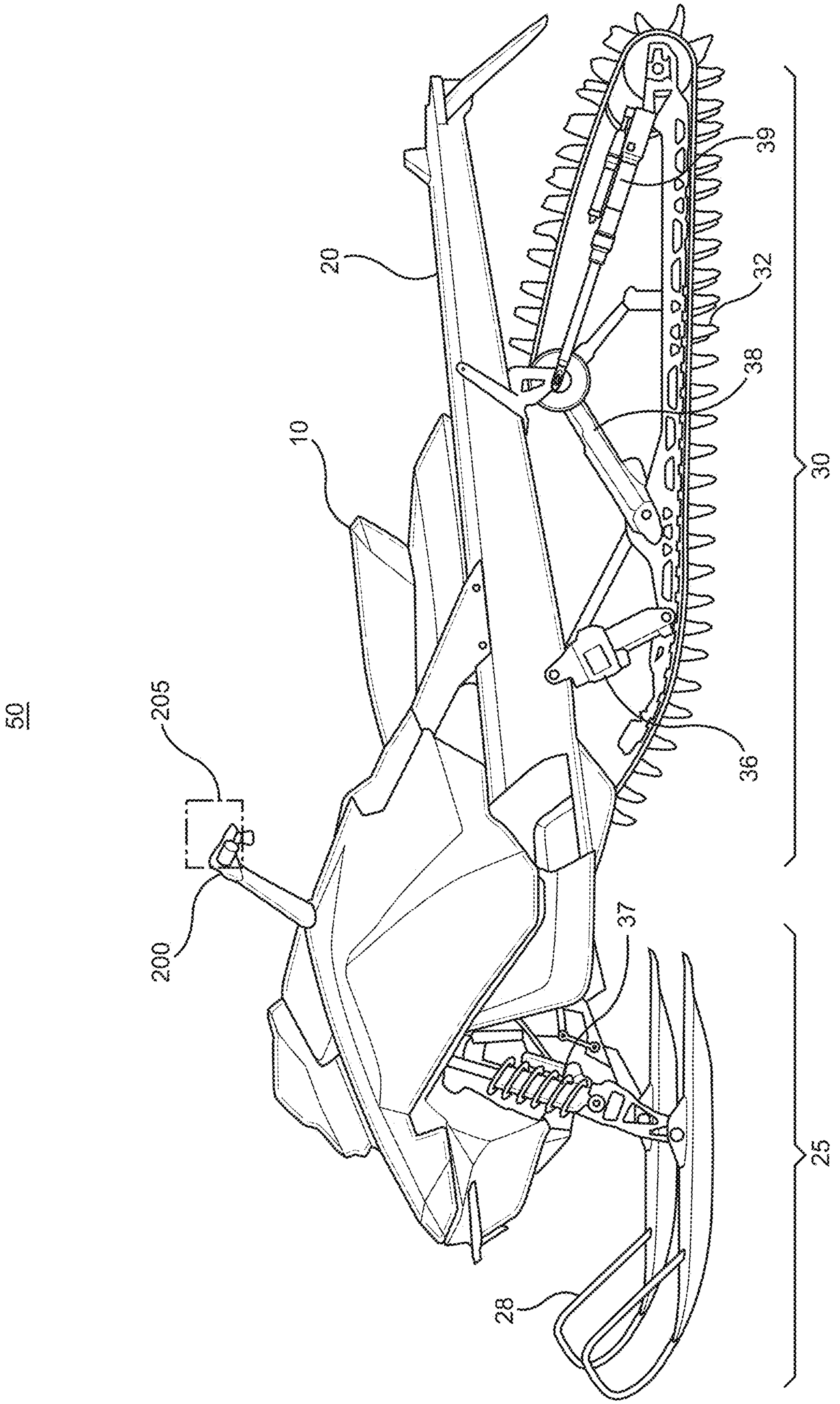
FIG. 7 is a perspective view of a snowmobile including a plurality of rear shock assemblies with electronic valves, in accordance with an embodiment.

Referring now to FIG. 7, a perspective view of a snowmobile 50 with a plurality of rear shock assemblies having an electronic valve (e.g., rear track shock assembly 38 and rear track roller shock assembly 39) is shown in accordance with an embodiment. In general, a number of the components of snowmobile 50 of FIG. 7 are similar to those of snowmobile 50 of FIG. 1, and as such, only the different components are discussed herein. The discussion of the components of FIG. 7 that are similar to those of FIG. 1 is not repeated for purposes of clarity, but is instead incorporated by reference in its entirety.

In one embodiment, rear suspension assembly 30 includes a front track connection with front track shock assembly 36, a rear track connection with a rear track shock assembly 38, and a rearmost track connection with a rear track roller shock assembly 39.

In one embodiment, snowmobile 50 will only include a limited number of the electronically actuated components, interactive components, and/or control features. For example, a snowmobile 50 might only include user interface 205, rear track shock assembly 38, and rear track roller shock assembly 39 where the only setting that is electronically adjustable is the lockout setting.

In one embodiment, as discussed herein, there are times when specific changes to one, or some, but not all of the suspension component are desired during a given ride/drive. For example, a user of a snowmobile 50 (or other rear-suspended vehicle) that is performing a hill climb, traversing a section of deep snow, loose fresh snow, or the like, would benefit by being able to proficiently firm up and/or lockout rear track shock assembly 38 without necessarily modifying the damping characteristics of any other shock assemblies (e.g., front shock assemblies 37 and front track shock assembly 36) of snowmobile 50.

In one embodiment, depending upon the terrain being traversed, the length and/or overall flexibility of the rear suspension assembly 30, and the like, there is a need for an additional shock assembly (e.g., rear track roller shock assembly 39) to be locked out to limit any folding (or movement toward tail section 20) of the last portion of the rear suspension assembly 30 (and therefore track 32).

For example, in one embodiment, when a user encounters a hill climb, deep and/or loose snow, or the like, a locked out rear track shock assembly 38 setting will stop the rear suspension assembly 30 and track 32 from closing toward the tail section 20 causing the snowmobile 50 to take on a nose high attitude. However, it is possible that the portion of the rear suspension assembly 30 and track 32 that extend behind the connection of the locked out rear track shock assembly 38 will obtain an amount of flex that will allow the rear portion of the rear suspension assembly to move toward tail section 20.

One embodiment utilizes the user interface 205 (in one embodiment, a two position switch) coupled to the rear track shock assembly 38 and the rear track roller shock assembly 39 of the snowmobile 50 to provide a quick and easy complete tail hardening. For example, when the user encounters an environment (such as discussed above), the user would simply manipulate user interface 205 (e.g., flip it, push it, turn it, etc. to the firm position) which would cause both rear track shock assembly 38 and rear track roller shock assembly 39 to move to a firmer, firmest, and/or lockout state. In so doing, the firming of the rear track shock assembly 38 and rear track roller shock assembly 39 would remove an amount of flex from the rear suspension assembly 30 which would stop and/or reduce the rear suspension assembly 30 from closing toward the tail section 20, and in so doing, reduce or remove loop-out, sinking, tunneling, or the like, while allowing the machine to maintain the connection between the terrain and the tread.

In one embodiment, after the terrain had been traversed, the hill had been climbed, or as the user desires, the user would then manipulate the user interface 205 (e.g., flip it, push it, turn it, switch it, etc. to the not firm position) which would cause the rear track shock assembly 38 and rear track roller shock assembly 39 to unlock and return to its regular compression damping settings.

Communications Protocol

In one embodiment, one or more components of snowmobile 50 use a wireless network selected from one or more of: a wireless personal area network (WPAN), a low power network (LPAN), Internet of things (IoT) connectivity, or the like. In one embodiment, the wireless communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, one or more components of snowmobile 50 form a wireless mesh, such as a snowmobile area network (SAN) or the like. In one embodiment, one or more components of the SAN could interact with the user/rider in any number of ways such as via touch, sound, vision, radio, wearable, and the like.

In one embodiment, the wireless mesh may include protocols such as an auxiliary or propriety private network encryption such as AES 128. In one embodiment, the AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEADNonce. When the AES-128 symmetric key, and AEADNonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure.

In one embodiment, one or more components within the wireless mesh may include communication protocols for one or more peers, such as an out-of-SAN wireless device that doesn't want to share its network. In this case, the out-of-SAN wireless device can provide a hardware interface and it can be piped into the SAN. Thus, in one embodiment, the wireless mesh network can be used to connect and/or control almost any wireless aspect, as the network, topology, and features thereof are well suited to interacting with basic device operating structures.

In one embodiment, information broadcast from a given component will include a unique identifier (ID) that identifies the specific component that made the broadcast. Thus, even when a number of different components are operating in the same environment, each component will be able to identify which component sent the signal based on the unique ID. In one embodiment, the unique ID is used during the programming/pairing of the components with the network.

In one embodiment, the unique ID is used to validate the sending component. Although a unique ID is used in one embodiment, in another embodiment, a different identification methodology may be used to identify the different components in the network. In one embodiment, the wireless network is an intra-vehicle wireless network (such as a SAN). In one embodiment, the intra-vehicle wireless network is a wireless mesh network. In one embodiment, the intra-vehicle wireless network includes an intra-vehicle transmission authentication and encryption protocol.

In one embodiment, the broadcast information or data (e.g., message payload) will include additional information/data comprising the wireless network which is passed to and from peripheral devices in the network. Thus, in one embodiment, the wireless network communication and/or wireless mesh network will allow for information/data to be exchanged between adjacent vehicles, vehicle networks, etc.

In one embodiment, the wireless network includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

The IVC transmission authentication and encryption protocol can be distinct and different from the intra-vehicle transmission authentication and encryption protocol, such that a device receiving a communication can determine the origin of the communication. Often, the origin of the communication is important depending upon the data provided in the communication. For example, a transmission that includes sensor provided information might only be verified and acted upon if it includes the intra-vehicle transmission authentication and encryption protocol (such as for security purposes or the like).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide information to a component on the user's machine, information that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by one or more components of the user's machine and may be used depending upon context, or the like.

In one embodiment, communication protocol is designed for low latency and long battery life. In one embodiment, the network implements the proprietary low-latency low-power radio protocol to provide an effective transport for communication between electronic valve 500 and user interface 205.

In one embodiment, the wireless signal is a "telegram" or the like that includes the unique identifier (ID) that identifies the component that broadcast the telegram signal. Thus, even when several devices are operating in the same environment, the telegram signal will identify which device sent the signal. Although the unique ID is used in one embodiment, in another embodiment, a different portion of the telegram signal is used to identify the transmitting device.

In one embodiment, one or more components will periodically send a heartbeat (e.g., check-in message), to inform one or more of the other components that they are still active. In one embodiment, the heartbeat is sent at a 1 Hz communication rate. In one embodiment, the component that received, but did not send, the heartbeat will provide a response message to confirm that there is a wireless connection therebetween.

In one embodiment, a timer is used to count down a check-in or heartbeat time period. In one embodiment, the time period measured by the timer is preset by the manufacturer. In one embodiment, the time period measured by the timer is adjustably set by the manufacturer, by the user, by a mechanic, based on the vehicle location, terrain type, or the like.

In one embodiment, when the timer expires, the heartbeat is sent. In one embodiment, once the wireless communication is confirmed, the timer will be restarted.

In one embodiment, if there is no response to the heartbeat with a predefined period of time, another heartbeat will be sent. In one embodiment, if there is still no response received, an additional pre-defined number of heartbeat signals will be sent.

In one embodiment, one or more of the components can be in a number of different energy states to conserve battery life. Although a number of states are discussed, in one embodiment there may be more, fewer, or a different combination or variation of the described energy states. The use of the disclosed energy states is provided herein as one embodiment and for purposes of clarity.

One state is referred to as the operating state. This is the highest battery power consumption state. In the operating state, the component is transmitting and/or receiving data.

In a standby state, the component is awake and there is a connection therebetween. For example, in the standby state, the user interface 205 is waiting to receive input from the user. When the user provides an input, user interface 205 will move into the operating state and transmit the data to electronic valve 500.

In one embodiment, when electronic valve 500 responds to the transmission from user interface 205, it will be known to both devices that there is a connection therebetween, that the signal has been received by electronic valve 500, and that one or both the electronic valve 500 and/or the user interface 205 can return to the standby state until the next time the user provides an input to user interface 205.

In one embodiment, the electronic valve 500 may not provide a response to the transmission from user interface 205. In one embodiment, user interface 205 may not expect a response from electronic valve 500 after user interface 205 sends the transmission.

In one embodiment, the electronic valve 500 may only provide the heartbeat message to the user interface 205 at pre-defined intervals to evidence the connection between user interface 205 and electronic valve 500.

In one embodiment, if user interface 205 expected but did not receive a response from electronic valve 500, user interface 205 will include a programmed pre-defined number of attempts at transmitting the signal to electronic valve 500 before making the determination that there is a disconnection in the communication between the user interface 205 and the electronic valve 500.

In one embodiment, such as after a period of inaction, or the user interface 205 determines that the snowmobile is not being ridden (e.g., based on a user input, a sensor input, or the like), such as for example, in one embodiment, a vibration sensor will determine that the snowmobile is stationary, the user interface 205 will send a standby message to inform electronic valve 500 and/or any active components that the snowmobile is not being ridden. In one embodiment, the electronic valve 500 and/or any active components will transition to a low-power mode or sleep mode when the standby message is received.

In one embodiment, once the electronic valve 500 and/or any active components user interface 205 is turned off (or otherwise not responding), electronic valve 500 and/or any active components will enter a no-heartbeat standby state (e.g., an intermediate battery power consumption state), where electronic valve 500 and/or any active components is awake and listening but is not sending any transmissions (e.g., heartbeat transmissions, etc.).

In one embodiment, electronic valve 500 and/or any active components will remain in the no-heartbeat standby state until the connection with user interface 205 is re-established. In one embodiment, when electronic valve 500 and/or any active components receives a message from user interface 205, it will know that the connection with user interface 205 is established (or re-established) and electronic valve 500 and/or any active components will transition from the no-heartbeat standby state to a heartbeat standby state.

In a dormant state, the snowmobile is stationary. For instance, the snowmobile is in storage or otherwise parked and not being ridden. In one embodiment, when in the dormant state, active components such as the user interface 205, electronic valve 500, and/or any other active (or power consuming) components, will go into low-power mode. In one embodiment, while in the dormant state, electronic valve 500 and/or any active components will periodically wake up to transmit a signal to user interface 205. If no response is received, electronic valve 500 and/or any active components will return to the dormant state, e.g., go back to sleep.

In contrast, if electronic valve 500 and/or any active components receives a response from user interface 205 during the periodic wakeup, in one embodiment, electronic valve 500 and/or any active components will change from the dormant state into the standby state.

In one embodiment, while in the dormant state, when motion is detected, the vibration sensor will wake the microcontroller on the user interface 205 (or in another embodiment, on the shock assembly, on another active component, or the like) which will then transmit a wake-up signal to the other components. In one embodiment, the wake-up signal will be transmitted a number of times over a given time period (e.g., a time period longer than the periodic wakeup time period to ensure the other components receive the wake-up transmission.

In one embodiment, while in the dormant state, when motion is detected, the vibration sensor will wake the microcontroller on a number of components such as user interface 205, the shock assembly, and/or another active component. In one embodiment, a user may interact with a component such as a button on user interface 205 (or turning a key to an on position, pushing a start button, operating the throttle, bouncing the suspension, or the like) which will cause the components to wake from the dormant state.

Thus, in one embodiment, the electronic valve 500, any active components, and/or the user interface 205 can move between the different states fluidly using the model described above. In one embodiment, the electronic valve 500, any active components, and/or the user interface 205 will try to remain in (or return to) the lowest powered state for the specific situation.

In one embodiment, the power draw for each state is approximated as an average of 150 microamp draw during the active state, an average of 32 microamp draw during either standby state, and an average of 1 microamp draw during the dormant state.

In one embodiment, for example when the power source is a battery such as a CR2032, the capacity is approximately 173 mAh. As such, and based on the power draw for each state, the expected battery life of the battery of the electronic valve 500, any active components, and/or the user interface 205 is a number of months. In one embodiment, depending upon the duty cycle, the lifespan of the battery will be different.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A suspension system comprising:

at least one front shock assembly;

at least one rear shock assembly comprising an electronic valve, wherein said electronic valve is configured to adjust a stiffness of said at least one rear shock assembly; and a user interface communicatively coupled with said electronic valve, said user interface configured to provide a signal to said electronic valve to increase a firmness of said at least one rear shock assembly or return said at least one rear shock assembly to an increased firmness configuration, wherein said increased firmness configuration is achieved by an air shock system comprising:

a main gas chamber containing a volume therein; and a secondary gas chamber containing a volume therein, said secondary gas chamber and said main gas chamber configured to be selectively placed either a first state wherein said secondary gas chamber and said main gas chamber are in fluid communication with each other or a second state wherein said secondary gas chamber and said main gas chamber are not in fluid communication with each other.

2. The suspension system of claim 1, wherein said user interface is located remote from said at least one rear shock assembly.

3. The suspension system of claim 2, wherein said user interface is wirelessly coupled with said at least one rear shock assembly.

4. The suspension system of claim 2, wherein said user interface is coupled with said at least one rear shock assembly via a wired connection.

5. The suspension system of claim 1, wherein said control valve is selected from a group consisting of: a rotary spool valve, a check shim valve, and a two-state valve.

6. The suspension system of claim 1, wherein said control valve adjusts said stiffness of said at least one rear shock assembly to a firmest compression setting.

7. The suspension system of claim 1, wherein said control valve adjusts said stiffness of said at least one rear shock assembly to a lockout compression setting.

8. The suspension system of claim 1, further comprising:

a plurality of rear shock assemblies, wherein at least two of said plurality of rear shock assemblies comprise: said electronic valve, wherein said electronic valve is configured to adjust said stiffness of said at least two rear shock assemblies.

9. The suspension system of claim 8, wherein said user interface is communicatively coupled with each of said at least two of said plurality of rear shock assemblies.

* * * * *